United States Patent [19]

Yoshimoto et al.

[11] Patent Number: 5,158,654

[45] Date of Patent: * Oct. 27, 1992

[54] OZONE DECOMPOSING REACTOR AND REGENERATION THEREOF

[75] Inventors: Masafumi Yoshimoto; Tadao Nakatsuji; Kazuhiko Nagano; Kimihiko Yoshida; Masahiro Tanaka, all of Osaka, Japan

[73] Assignee: Sakai Chemical Industry Co., Ltd., Osaka, Japan

[ * ] Notice: The portion of the term of this patent subsequent to Nov. 3, 2009 has been disclaimed.

[21] Appl. No.: 525,596

[22] Filed: May 21, 1990

[30] Foreign Application Priority Data

May 19, 1989 [JP] Japan .................................. 1-127527
Jun. 6, 1989 [JP] Japan .................................. 1-143380
Dec. 11, 1989 [JP] Japan .................................. 1-320962

[51] Int. Cl.⁵ .......................... C25B 1/00; C25B 9/00
[52] U.S. Cl. ................................ 204/59 R; 204/130; 204/252; 204/282; 204/421; 429/30; 429/32
[58] Field of Search .................... 204/59 R, 120, 130, 204/141.5, 140, 252, 242, 295, 282, 421; 502/20; 429/30, 32

[56] References Cited

U.S. PATENT DOCUMENTS

| 3,400,054 | 9/1968 | Ruka et al. ........................... 204/130 |
| 4,101,296 | 7/1978 | Lowther ............................... 204/130 |
| 4,670,360 | 6/1987 | Habermann et al. ................. 429/33 |

FOREIGN PATENT DOCUMENTS 0675253  7/1952  United Kingdom ................ 204/130

Primary Examiner—John Niebling
Assistant Examiner—Kathryn Gorgos
Attorney, Agent, or Firm—Wenderoth, Lind & Ponack

[57] ABSTRACT

There is disclosed an ozone decomposing reactor which comprises:

an air permeable carrier containing a catalyst and an electroconductive material therein or thereon; and electrodes attached to the sheet to electrify and heat the sheet, whereby to decompose ozone at elevated temperatures.

A fibrous sheet or a foamed material is used as the air permeable carrier.

13 Claims, 3 Drawing Sheets

OZONE DECOMPOSING REACTOR AND REGENERATION THEREOF

BACKGROUND OF THE INVENTION

This invention relates to a reactor for decomposing ozone contained in a fluid such as a waste water or a waste gas. The invention further relates to a method of the regeneration of such a reactor.

There has been proposed various methods of decomposing noxious ozone contained in the air, for example, an adsorption method wherein porous material is used such as activated carbon or zeolite, or an oxidative decomposition method wherein a catalyst is used such as $MnO_2$.

However, the above known methods of decomposing ozone are not satisfactory ones. The adsorption method has a disadvantage in that an adsorbent must be regenerated frequently since it is limited in adsorption ability. Therefore, such method is laborious and costs a great deal. The oxidative decomposition method has no such disadvantages as above described, but the known catalysts have no sufficient decomposition activity of ozone, but also deteriorate in activity very soon when they are used under severe conditions, for example, when a gas which contains a high concentration of ozone is treated or a gas is treated with a high space velocity.

The invention has been accomplished to solve the problem involved in the prior art of ozone decomposition, and it is an object of the invention to provide a reactor which oxidatively decomposes ozone at a high rate even under severe conditions.

It is a further object of the invention to provide a method of decomposing ozone using such a reactor.

It is still a further object of the invention to provide a method of regenerating such a reactor.

BRIEF DESCRIPTION OF THE DRAWINGS

Other features and advantages of the invention will be apparent from the following description taken in connection with the accompanying drawings, wherein.

Figure 1:
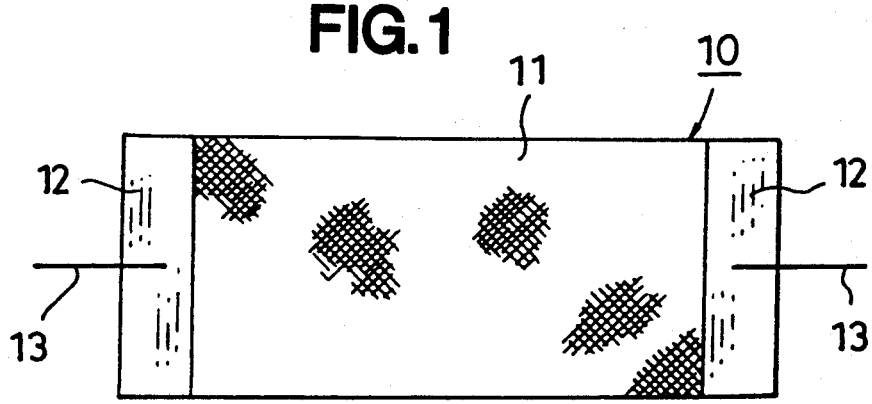
FIG. 1 is a plan view of an embodiment of a fibrous sheet as a catalyst structure which carries a catalyst and an electroconductive material therein or thereon and is used in an ozone decomposing reactor of the invention.

Herein the specification, the term, catalyst, means active components which have ozone decomposition activity. The catalyst is usually supported on a carrier to form a catalyst structure together with other additives for practical use. These structures will be referred to as catalyst structures.

SUMMARY OF THE INVENTION

In accordance with the invention, there is provided an ozone decomposing reactor which comprises:

an air permeable sheet containing a catalyst and an electroconductive material therein or thereon; and electrodes attached to the sheet to electrify the sheet, whereby to decompose ozone at elevated temperatures.

In accordance with the invention, an air permeable sheet is used as a carrier or a substrate for supporting a catalyst and an electroconductive material therein or thereon. The air permeable sheet is preferably a fibrous sheet or a foamed material such as a synthetic resin foam or a ceramic foam.

The fibrous sheet includes a woven sheet and a nonwoven sheet. The fibrous sheet may be composed of organic fibers such as polyester fibers, polyamide fibers or polyefin fibers, or inorganic fibers such as glass fibers, silica fibers, alumina silica fibers or carbon fibers or a mixture of two or more.

DESCRIPTION OF THE PREFERRED EMBODIMENT

It is preferred that the fibrous sheet used is resistant to a high temperature of more than 100° C., most preferably of more than 150° C., and also a high processability since the fibrous sheet is very often formed into and used as corrugated sheets. It is also important that the fibrous sheet has an air permeability of from about 100 ml/cm$^2$.sec. to 50 l/cm$^2$.sec. from the standpoint of ozone decomposition rate and pressure loss when an ozone containing fluid is passed through the fibrous sheet. When the fibrous sheet has an air permeability of less than 100 ml/cm$^2$.sec., the fibrous sheet has a large ozone decomposition rate, but a large pressure loss results. When the fibrous sheet has an air permeability of more than 50 l/cm$^2$.sec., there takes place substantially no pressure loss, but ozone decomposition rate attained is unfeasibly low. It is further preferred that the fibrous sheet used has a void rate of not less than 85%.

Any known catalyst may be supported on a carrier, and the catalyst may include, for example, $MnO_2$, $MoO_3$, $CuO$, $Fe_2O_3$, $Ag_2O$, $NiO$, $Co_3O_4$, $WO_3$, $V_2O_5$, $SnO_2$, Pt and Pd. These catalysts may be used singly or as a mixture of two or more. Further, there may be used as a catalyst, for example, a binary catalyst such as $MnO_2/TiO_2$, $MnO_2$/alkali metal oxide or $MnO_2$/alkaline earth metal oxide, or a zeolite catalyst composed of a zeolite having a metal of an oxide of which oxide formation enthalpy—$\Delta H°f$ is of not more than 100 Kcal/g-atom of oxygen.

The electroconductive material used in the invention may be any material of electrical resistance which generates heat when being electrified. Thus, there may be used as such an electroconductive material, for example, graphite, carbon fibers, silicon carbide, silver, nickel.chromium alloy, chromium-aluminum alloy or stainless steel. These electroconductive materials may be in the form of a powder, whiskers or fibers.

The catalyst structure composed of a fibrous sheet carrying a catalyst and an electroconductive material therein or thereon will be first described.

The catalyst is supported on the fibrous sheet as a carrier together with an electroconductive material to form a catalyst structure. The fibrous sheet may have the catalyst and electroconductive material evenly dispersed throughout the sheet or evenly supported on the surface thereof as a thin layer. The former method is in particular applicable to the production of the catalyst structure using a nonwoven fibrous sheet as a carrier, whereas the latter method is applicable to the production of the catalyst structure using either a nonwoven fibrous sheet or a woven fibrous sheet as a carrier.

The latter method includes two methods: an immersing method and a wash coat method. According to the immersing method, the fibrous sheet is immersed in a solution of a precursor of a catalyst to impregnate the fibrous sheet with the solution, and is then dried and calcined to convert the precursor into the catalyst. The precursor may be a water soluble compound, for example, manganese acetate, which is converted into manganese oxides by being heated. In a wash coat method, in turn, the fibrous sheet is immersed in a slurry of a catalyst and is then dried to provide a catalyst structure.

It is preferred that the fibrous sheet has an electroconductive material supported thereon in an amount of about 20-60% by weight based on the fibrous sheet. When the amount of the electroconductive material supported on the fibrous sheet is less than about 20% by weight, the fibrous sheet remains substantially insulative so that it is not heated by being electrified, whereas when the amount is more than about 60% by weight, an effective contact of ozone with the catalyst is prevented to reduce ozone decomposition rate of the reactor.

The fibrous sheet has the catalyst in an amount of 50-250% by weight based on the fibrous sheet. There is no special advantage to support a catalyst in an amount of more than 250% by weight, but it is rather undesirable from the economical standpoint. However, when the amount of the catalyst supported on the fibrous sheet is less than 50% by weight, the activity of ozone decomposition attained is unfeasibly low.

The catalyst structure composed of a foamed material carrying a catalyst and an electroconductive material thereon is also useful in the invention.

The foamed material used as a carrier in the invention includes a synthetic resin foam such as a polyurethane foam or a ceramic foam. The ceramic foam is a known material and is produced by depositing a ceramic slurry on a synthetic resin foam and then calcining the composite so that the resin foam is burnt out to leave a porous or foam body of the ceramic.

It is preferred that the foam has a porosity of 6-40 cells/inch from the standpoint of ozone decomposition rate and pressure loss when an ozone containing fluid is passed through the foam. However, the foam used in the invention is not specifically limited in shape, and it may be in the form of cube, rectangular parallelepiped, disk or plate. Further, the foam may have titanium dioxide, alumina, silica, silica-alumina or clay supported thereon so that a catalyst is readily supported thereon.

The catalyst and electroconductive material are supported on the foam by the immersing or wash coat method as hereinbefore set forth. By way of example, when the foam has micropores of 300-340 Å in diameter and a micropore volume of 0.26-0.29 ml/g, it is preferred that the catalyst is supported in an amount of 0.05-0.5 g per unit volume of the foam. When the amount of the catalyst supported on the foam is less than 0.05 g/ml of the foam, the resultant catalyst structure has a small ozone decomposition rate. When the amount of the catalyst supported on the foam is more than 0.5 g/ml of the foam, the catalyst is supported unevenly on the foam so that a high decomposition rate is not attained for the amount supported.

Further, it is preferred that the foam has the catalyst supported in an amount of 30-70% by weight based on the materials supported on the foam. It finds no special advantage to carry a catalyst on a foam in an amount of more than 70% by weight, but is rather uneconomical. However, when the amount of the catalyst supported is less than 30% by weight, the activity of ozone decomposition attained is unfeasibly low.

It is preferred that the foam has an electroconductive material supported thereon also in an amount of about 30-70% by weight based on the materials supported on the foam. When the amount of the electroconductive material supported on the foam is less than about 30% by weight based on the materials supported on the foam, the foam remains substantially insulative so that it is not heated by being electrified, whereas when the amount is more than about 70% by weight, an effective contact of ozone with the catalyst is prevented to reduce ozone decomposition rate of the reactor.

It is further preferred that the foam has a layer of the catalyst of a thickness of 10-200 $\mu$m throughout the microporous structure. When the thickness is less than 10 $\mu$m, the catalyst structure has an insufficient activity of ozone decomposition per unit volume of the catalyst structure. However, even when the thickness is more than 200 $\mu$m, the ozone decomposition activity is not additionally improved.

In addition to the above, there arise disadvantages as follows when the thickness is more than 200 $\mu$m. First, a large pressure loss takes place when an ozone containing fluid is passed through the catalyst structure so that a large power and a large power cost are necessary. Secondly, the catalyst covers unevenly the surfaces of the walls of micropores of the foam so that the openings are irregular in section and the fluid is prevented from effective diffusion into the catalyst layer. This leads to a reduced ozone decomposition activity per unit volume of the catalyst structure. Thirdly, the catalyst material is apt to be separated from the foam and undesired environmental pollution is possibly brought about.

When the immersing or wash coat method is employed to support the catalyst on a carrier, a fibrous material may be supported thereon. Any fibers may be used provided that they are resistant to ozone and are readily supported on the carrier. The fibers may be such that they have a large length/diameter ratio such as mullite ceramic fibers, C or E glass fibers or stainless steel fibers, or such that they have a small length/diameter ratio such as potassium titanate fibers or silicon carbide whiskers. However, from the standpoint of ease of supporting and useful synergetic effect of catalytic decomposition and mechanical decomposition of ozone with fibers, the fibers used have preferably of a length of 0.1-20 $\mu$m and a length/diameter ratio of 10-1000 when being supported on a carrier.

The fibers are supported on a carrier preferably in an amount of 2-20% by weight based on the materials supported on the carrier. When the amount of the fibers is more than 20% by weight, the fibers are unevenly supported on a carrier and prevents effective decomposition of ozone with the catalyst.

FIG. 1 illustrates an embodiment of a catalyst structure 10 composed of a fibrous sheet 11 which has a catalyst and an electroconductive material supported thereon. The catalyst structure is illustrated as a rectangular sheet and has a pair of electrodes 12 attached to the opposite sides. Each electrode has a lead wire 13 to be connected to a power so that the catalyst structure 10 is electrified and heated.

Figure 2:
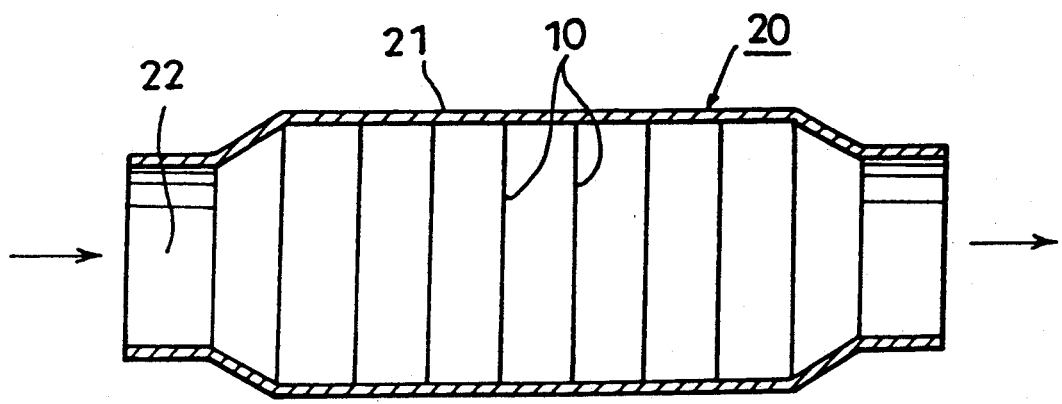
FIG. 2 is a longitudinal section of an embodiment of an ozone decomposing reactor of the invention.

FIG. 2 shows an embodiment of an ozone decomposing reactor of the invention wherein the above mentioned catalyst structure 10 is used. The reactor 20 comprises an insulative casing 21 which has an axial passage 22 for passing an ozone containing fluid therethrough. The reactor has a plurality of the catalyst structures 10 composed of the fibrous sheets extending across the passage 22 and arranged parralel to each other at a distance. The fluid is forced to pass through the catalyst structure 10, and during the passage, ozone is put to into contact with the catalyst structure, as indicated by arrows.

Figure 3:
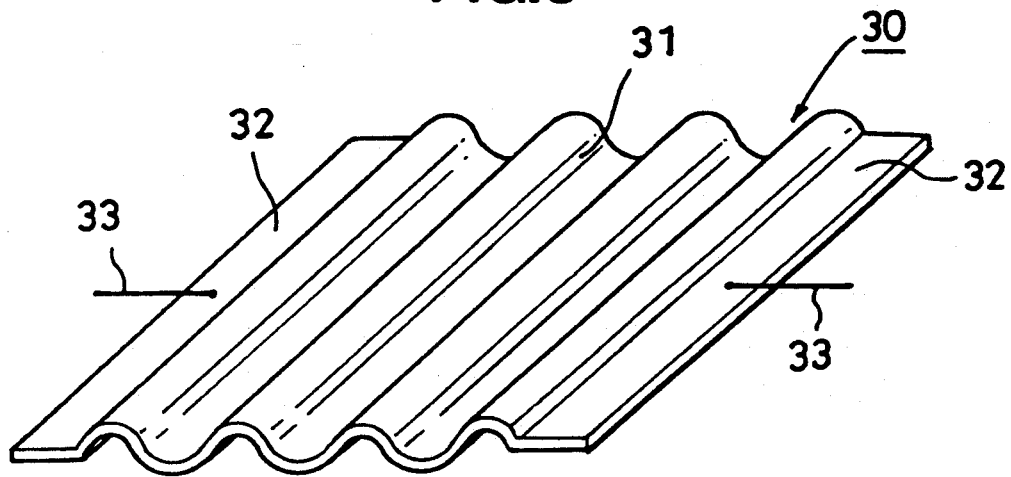
FIG. 3 is a perspective illustration of a corrugated fibrous sheet carrying a catalyst and an electroconductive material therein or thereon as a further embodiment of a catalyst structure used in an ozone decomposing reactor of the invention.
Figure 4:
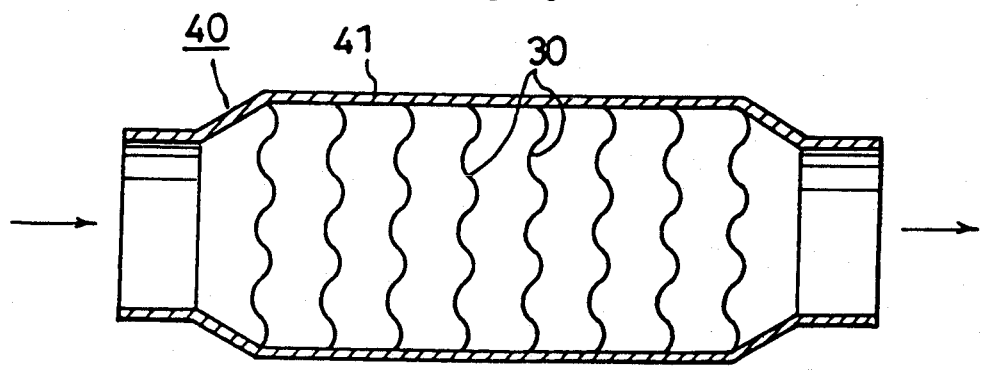
FIG. 4 is a longitudinal section of a further embodiment of an ozone decomposing reactor of the invention.

FIG. 3 illustrates a corrugated catalyst structure 30 which is composed of a corrugated fibers board 31 and has a pair of electrodes 32 attached to the opposite sides. Each electrode has a lead wire 33 to be connected to a power. FIG. 4 illustrates a reactor 40 wherein the above mentioned corrugated catalyst structures 30 are arranged in a casing 41 in the same manner as in the FIG. 2.

In operating the reactor, the catalyst structure is electrified so that it is heated while a fluid which contains ozone therein is forced to pass through the catalyst structures, and during the passage the fluid is put into contact with the catalyst so that ozone is catalytically decomposed at elevated temperatures.

Figure 5:
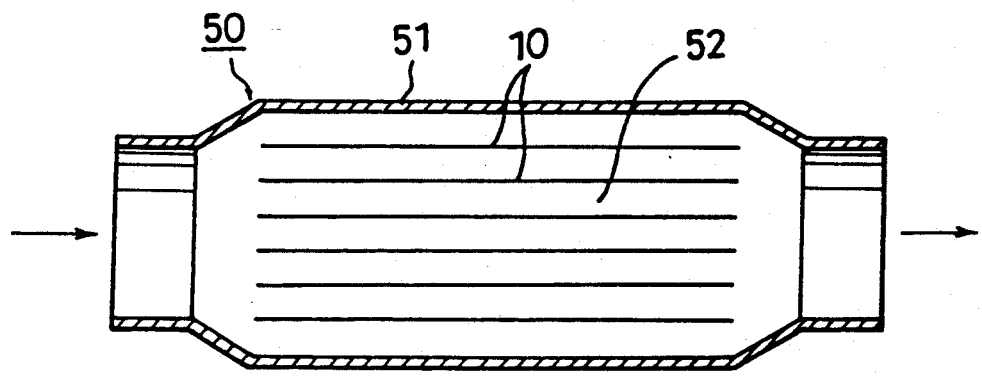
FIG. 5 is a longitudinal section of a still further embodiment of an ozone decomposing reactor of the invention.

FIG. 5 illustrates a further embodiment of a reactor 50 of the invention, in which a plurality of the catalyst structures 10 of fibrous sheets are disposed parallel to each other along the axis of the reactor to form passages 52 between the catalyst structures.

When this reactor is used, an ozone containing gas is passed through the passage 52 of the casing along the catalyst structures, and during the passage the fluid is put into contact with the catalyst so that ozone is catalytically decomposed at elevated temperatures, as indicated by arrows.

Figure 6:
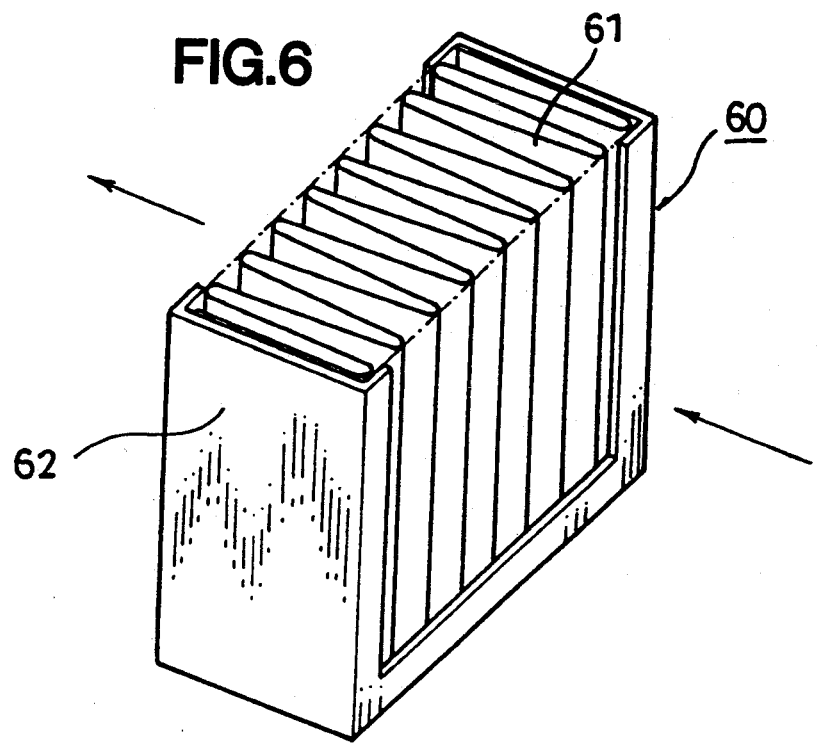
FIG. 6 is a perspective illustration of a further embodiment of a reactor of the invention.

FIG. 6 shows a reactor 60 which has a catalyst structure 61 folded like bellows in a casing 62. An ozone containing fluid is forced to pass through the structure as shown by arrows.

Figure 7:
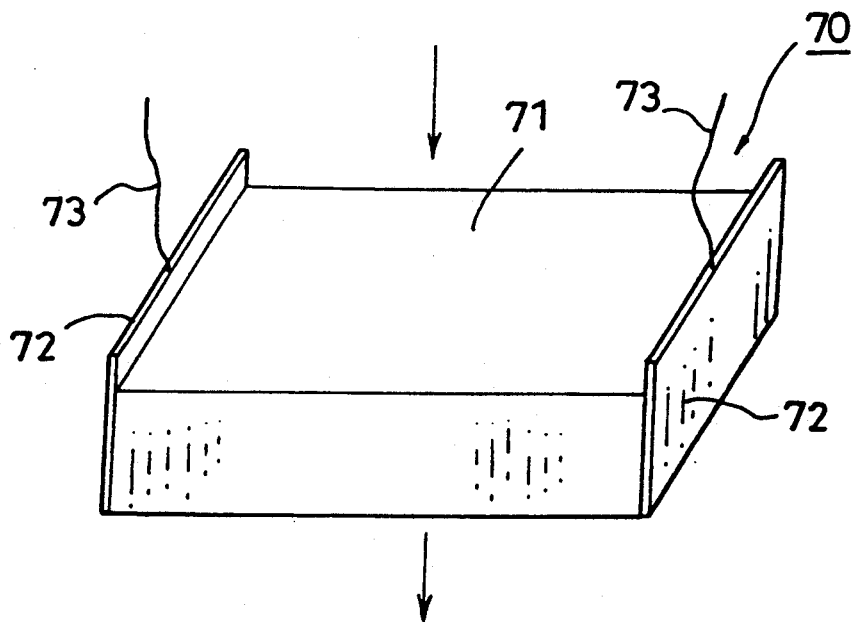
FIG. 7 is a perspective view of a catalyst structure composed of a foamed material carrying a catalyst and an electroconductive material thereon and having a pair of electrodes attached to the opposite sides thereof.
Figure 8:
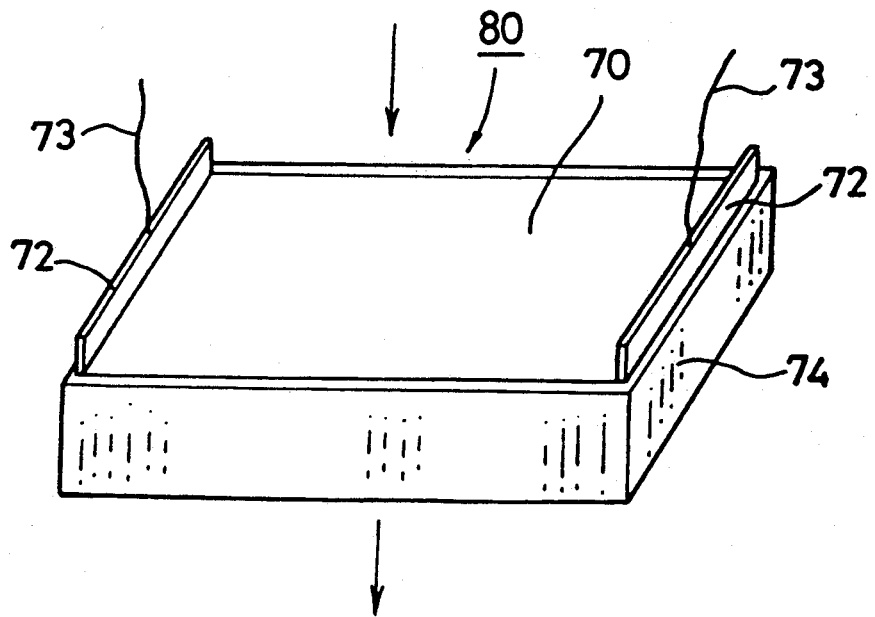
FIG. 8 is a perspective view of a reactor which has the catalyst structure placed in an insulative casing.

FIG. 7 illustrates a catalyst structure 70 composed of a foam 71 carrying a catalyst and an electroconductive material thereon and having a pair of electrodes 72 attached to the opposite sides each of which has a lead wire 73 to be connected to a power so that the structure is electrified. FIG. 8 shows a reactor 80 in which the above mentioned structure 70 is placed in an insulative casing 74.

In operating the reactor, the catalyst structure is electrified so that it is heated while a fluid which contains ozone therein is forced to pass through the catalyst structures, as indicated by arrows, and during the passage the fluid is put into contact with the catalyst so that ozone is catalytically decomposed at elevated temperatures.

The ozone decomposition may be carried out at a temperature of not less than about 20° C., preferably at a temperature of 30°-90° C. When the reaction temperature is less than about 20° C., high valency oxides produced by the reaction of ozone and the catalyst are not decomposed and oxygen accumulates in the catalyst structure, to reduce ozone decomposition rate of the reactor with time.

The reaction temperature at which no reduction of the reaction rate takes place depends upon the catalyst used and the amount of ozone put into contact with per unit amount of the catalyst per unit time. In this regard, it is useful to determine the reaction temperature based on a CA value. The CA value is herein the specification is defined as the product of ozone concentration (ppm) at an inlet of a reactor and an area velocity of a waste gas introduced into the reactor, and the area velocity is defined as the value of space velocity $(hr^{-1})$ of the gas divided by gas contact area per unit volume $(m^2/m^3)$ of catalyst structure. For example, when a waste gas is treated at a CA value of 100000 with a catalyst of $MnO_2$, the reaction is carried out at 60° C. When a binary catalyst of $MnO_2$ (80% by weight)/$Ag_2O$ (20% by weight) is used, the reaction is carried out at 55° C., while a ternary catalyst of $MnO_2$ (70% by weight)/$Ag_2O$ (10% by weight)/$TiO_2$ (20% by weight) is used, the reaction is carried out at 40° C. Meanwhile, when a waste gas is treated at a CA value of 1000 with the catalysts as above, the reaction may be carried out at temperatures of 55° C., 50° C. and 35° C., respectively.

The ozone decomposition rate is dependent upon an area velocity under fixed reaction temperatures and ozone concentrations, but it varies also depending upon an air permeable carrier material used and its air permeability, and manners in which the catalyst material is disposed in a casing as well. More specific description will be given in examples described hereinafter.

As set forth above, the reactor of the invention contains an electroconductive material so that it is electrified and ozone is put into contact with the catalyst at elevated temperatures. Therefore, ozone is decomposed at a high rate while the catalyst retains its high activity over a long period of time even under severe reaction conditions.

As a further aspect of the invention, there is provided a method of regenerating the ozone decomposing reactor as hereinbefore described, which comprises: electrifying and heating the catalyst structure to an elevated temperatures, thereby to regenerate the catalyst.

The method is further applicable to a permeable catalyst structure which comprises a carrier material composed of an electroconductive and electrically resistant metal and a catalyst supported thereon. The metal carrier may be of iron, cobalt, molybdenum, titanium, zirconium, chromium, silver, gold, copper, nickel or tin, or an alloy including stainless steels, copper alloys, nickel alloys, tin alloys, chromium alloys. Among these are preferred stainless steels such as SUS 430 or 304 from the standpoint of workability, resistivity and resistance to ozone.

The metal carrier used is preferably a net or screen or plate which has a number of micropores of very short length extending in the direction of thickness of the carrier material. A metal plate which has such micropores may be produced by etching a plate or punching micropores in a plate. When the catalyst structure is used in such a manner that an ozone containing gas is passed forcibly therethrough, it is preferred that the micropores are not less than 30 $\mu$m, preferably in the range of 200-500 $\mu$m, in diameter to prevent the occurrence of substantial pressure loss during the passage of the gas through the catalyst structure.

The catalyst may be supported on a carrier material in any manner. For instance, when a steel wire net or a screen is used as a carrier material, it is heated in the air to form a layer of oxides on the surface of the wire, and an ozone decomposition catalyst is supported thereon. Alumina may be thermally sprayed on a wire net, and an ozone decomposition catalyst may be supported thereon. Wires of a net may be made porous by dissolving out in part at the surface layer, and alumina is supported thereon, and then a catalyst may be supported on the alumina. The catalyst is usually supported in an amount of 5-25% by weight based on the carrier material.

When an aluminum coated carrier material or an electrically resistant material is used, the aluminum is first oxidized, and thereupon an ozone decomposition catalyst may be supported. Alumina may be supported on a net by an electrophoretic method and thereupon a catalyst may be supported.

However, the supporting of a catalyst on a carrier material should be interpreted in a broad sense in the invention. Therefore, the following treatments are taken in the invention as embodiments of supporting a catalyst on a carrier material. Namely, it is an embodiment of supporting ferric oxide on a stainless steel wire net to heat the net in the air to produce ferric oxide on the surface of the wire. Further, it is also an embodiment of supporting platinum or palladium on a stainless steel wire net to substitute iron in part with platinum or palladium, which has ozone decomposition activity, by an electrochemical manner.

If necessary, the thus prepared catalyst structure may be further worked or combined together, to have a variety of forms or structures.

The catalyst structure inclusive of such ones as composed of a metal carrier and a catalyst supported thereon is preferably used at a temperature of not less than about 20° C., as hereinbefore set out. However, it is still often found that the ozone decomposition rate reduces with time when ozone decomposition reaction is carried out at about 20° C. It may be necessitated by some reason that the reaction be carried out at lower temperatures, where the more severe the reaction conditions, the more rapidly the decomposition rate reduces.

However, in accordance with the invention, the catalyst structure is regenerated by electrifying and heating the catalyst structure thus deactivated at temperatures preferably of not less than about 40° C., more preferably of not less than about 50° C., and most preferably of not less than about 70° C. More the temperature at which the catalyst structure is regenerated, the higher the ozone decomposition rate attained, so that the decomposition can be carried out over a longer period of time until the catalyst structure is again deactivated to a predetermined level of activity.

The invention will now be described in more detail with reference to the examples, however, the invention is not limited thereto.

EXAMPLE 1

An amount of 50 g of a ternary catalyst of $MnO_2$ (70% by weight)/$Ag_2O$ (10% by weight)/$TiO_2$ (10% by weight) having a specific surface area of 32 $m^2/g$ and an average particle size of 50 $\mu$m, 100 g of silica sol, 50 g of graphite powder and water were admixed together to provide an aqueous slurry having a solid content of 100 g/l.

A glass cloth ($L_{55}$ FT 10000 from Unitica M Glass K. K.) having an air permeability of 30 $l/cm^2$.sec. of 30 mm $\times$ 35 mm was immersed in the slurry, and was then air-dried, to provide a catalyst structure. The catalyst was found to be supported in an amount of 146% based on the fibrous sheet.

A pair of copper electrodes were attached to the opposite sides of 35 mm length of the fibrous sheet as illustrated in FIG. 1. The catalyst structure was found to have a resistance of 210 $\Omega$.

Seven catalyst structures were disposed in a casing as illustrated in FIG. 2 at a fixed distance so that the distance from the first to the seventh structure was 70 mm, thereby to provide a reactor having a gas contact area of 100 $m^2/m^3$.

EXAMPLE 2

A ceramic fibers sheet (weight of 90 $g/m^2$ and thickness of 5 mm from Oriental Asbestos K. K.) of 30 mm $\times$ 35 mm was immersed in the same slurry as in the Example 1, and was then air-dried, to provide a catalyst structure having the catalyst supported in an amount of 125% based on the fibrous sheet. The catalyst structure was found to have a resistance of 193 $\Omega$.

The activity of the reactor was measured as follows. The air was introduced into an ozone generator so that the air contained ozone in a predetermined concentration, and then the air was sent to the reactor while the reactor was electrified. The ozone concentrations in the air at the inlet and the outlet of the reactor were analyzed with an ozone analyzer. Ozone decomposition rate (%) was calculated based on an expression: $[(C_1-C_2)/C_1] \times 100$, wherein $C_1$ is an ozone concentration at the inlet and $C_2$ is an ozone concentration at the outlet. The results are shown in the Table 1.

TABLE 1

| | Temperature (°C.) | | Ozone Concentration at Inlet of Reactor (ppm) | CA Value | Ozone Decomposition Rate (%) | | |
|---|---|---|---|---|---|---|---|
| | Catalyst Structure | Gas at Outlet of Reactor | | | Initial | After 100 hr. | After 1000 hr. |
| Example 1 | 20 | 20 | 1000 | 10000 | 82.5 | 35.6 | 9.5 |
| | 30 | 21 | 1000 | 10000 | 88.9 | 70.4 | 32.5 |
| | 40 | 23 | 1000 | 10000 | 97.3 | 90.2 | 59.6 |
| | 50 | 28 | 1000 | 10000 | 98.8 | 98.9 | 98.9 |
| Example 2 | 20 | 20 | 1000 | 10000 | 80.6 | 28.4 | 6.7 |
| | 30 | 21 | 1000 | 10000 | 86.3 | 64.5 | 31.3 |
| | 40 | 23 | 1000 | 10000 | 97.2 | 88.7 | 53.9 |
| | 50 | 28 | 1000 | 10000 | 98.5 | 98.4 | 98.5 |

As apparent from the Table 1, the higher the temperature of the catalyst structure, the higher the ozone decomposition rate and the more durable the catalyst structure.

EXAMPLE 3

An amount of 100 g of a ternary catalyst of $MnO_2$ (70% by weight)/$Ag_2O$ (10% by weight)/$TiO_2$ (20% by weight) of a specific surface area of 32 m²/g and an average particle size of 30 μm, 30 g of graphite powder, 90 ml of silica sol and 150 ml of alumina beads were mixed together, and the mixture was wet-milled over 30 minutes, to provide an aqueous slurry.

A polyurethane foam (HR-20 from Bridgestone Tire K.K.) was immersed in the slurry, and then was passed between a pair of rolls having a 2 mm clearance therebetween to remove an excess of the slurry. Then, the foam was dried at 50° C. over 18 hours, to provide a catalyst structure. The catalyst structure was found to have the catalyst in an amount of 0.19 g per ml of the foam and a catalyst layer of a thickness of 74 μm as an average of 50 points measurement.

Then the foam was cut into a catalyst structure of a size of 30 mm×30 mm×5 mm (thickness) and a pair of stainless steel electrodes were fitted to the opposite sides, as illustrated in FIG. 7. The catalyst structure was found to have a resistance of 102Ω.

The catalyst structure was placed in an insulative casing to provide a reactor as illustrated in FIG. 8.

EXAMPLE 4

An alumina-cordiellite ceramic foam (#13 from Bridgestone Tire K.K.) was immersed in the same slurry as in the Example 3, and an excess of the slurry was removed by air-blowing. Then, the foam was dried at 50° C. over 18 hours, to provide a catalyst structure. The catalyst structure was found to have the catalyst in an amount of 0.26 g per ml of the foam and a catalyst layer of a thickness of 93 μm.

Then the foam was cut into a catalyst structure and a pair of stainless steel electrodes were fitted to the opposite surfaces in the same manner as in the Example 3. The catalyst structure was found to have a resistance of 98Ω.

The catalyst structure was placed in an insulative casing to provide a reactor as illustrated in FIG. 2.

The activity of the reactor was measured in the same manner as hereinbefore set forth. However, in this measurement, a CS value of $10^8$ ppm/hr was employed, instead of the CA value, which is defined as the ozone concentration at the inlet of the reactor multiplied by the space velocity, since a gas contact area per volume of the catalyst is undeterminable. The results are shown in the Table 2.

TABLE 2

| | Temperature (°C.) | | Ozone Concentration at Inlet of Reactor (ppm) | $CS^{1)}$ | Ozone Decomposition Rate (%) | | |
|---|---|---|---|---|---|---|---|
| | Catalyst Structure | Gas at Outlet of Reactor | | | Initial | After 100 hr. | After 1000 hr. |
| Example 3 | 20 | 20 | 1000 | $10^a$ | 96.5 | 25.9 | 2.5 |
| | 30 | 21 | 1000 | $10^a$ | 99.8 | 60.4 | 34.4 |
| | 40 | 23 | 1000 | $10^a$ | 99.9 | 81.0 | 43.7 |
| | 50 | 28 | 1000 | $10^a$ | 99.9 | 99.9 | 99.9 |
| Example 4 | 20 | 20 | 1000 | $10^a$ | 97.0 | 31.5 | 4.1 |
| | 30 | 21 | 1000 | $10^a$ | 99.9 | 62.8 | 38.6 |
| | 40 | 23 | 1000 | $10^a$ | 99.9 | 82.4 | 46.5 |
| | 50 | 28 | 1000 | $10^a$ | 99.9 | 99.9 | 99.9 |

Note:
$^{1)}$Ozone concentration at inlet of reactor × space velocity (ppm/hr)

EXAMPLE 5

There was prepared an air which contained 1000 ppm of ozone and the air was passed through the same reactor as in the Example 1 at a CA value of 10000 at 20° C. The ozone decomposition rate was measured every ten hours. The results are shown under the column of the catalyst "as prepared". The longer the period over which the ozone decomposition was carried over with the catalyst, the more the catalyst was deactivated.

As a separate experiment, the same reactor as in the Example 1 was electrified and heated to 50° C. every ten hours to regenerate the catalyst. The results are shown in the Table 3. The catalyst was regenerated to have an activity of more than 99% every ten hours.

TABLE 3

| Reaction Time (hr) | Ozone Decomposition Rate (%) | | |
|---|---|---|---|
| | As Prepared | Before Heating | After Heating |
| 0 | 82.4 | 82.3 | |
| 10 | 77.5 | 77.8 | 99.2 |
| 20 | 72.7 | 77.9 | 99.2 |
| 30 | 67.0 | 78.8 | 99.2 |
| 40 | 62.5 | 77.5 | 99.1 |
| 50 | 57.3 | 78.8 | 99.2 |
| 60 | 52.3 | 78.3 | 99.2 |
| 70 | 47.3 | 78.3 | 99.2 |
| 80 | 42.9 | 77.5 | 99.1 |
| 90 | 38.1 | 78.3 | 99.2 |
| 100 | 34.9 | 78.1 | 99.2 |

We claim:
1. An ozone decomposing reactor which comprises: an air permeable fiber sheet containing thereon or therein a catalyst having catalytic ozone decomposition activity to render the sheet active for ozone decomposition and an electroconductive material in the form of powder, fibers or whiskers in an amount of 20–60% by weight based on the sheet so that the sheet generates heat when electric current is applied thereto; and
electrodes attached to the sheet to electrify the sheet, whereby ozone is decomposed at elevated temperatures.

2. The ozone decomposing reactor as claimed in claim 1 wherein the catalyst is dispersed evenly throughout the fiber sheet.

3. The ozone decomposing reactor as claimed in claim 1 wherein the catalyst is supported as a layer on the fiber sheet.

4. An ozone decomposing reactor which comprises:
a casing having an axially extending passage for passing an ozone containing gas therethrough; and
a plurality of air permeable fiber sheets each extending across the passage and arranged parallel at a distance in the casing, said each sheet containing thereon or therein a catalyst having catalytic ozone decomposition activity to render the sheet active for ozone decomposition and an electroconductive material in the form of powder, fibers or whiskers in an amount of 20–60% by weight based on the sheet so that the sheet generates heat when electric current is applied thereto, and having a pair of electrodes attached to the opposite sides thereof to electrify the sheet, whereby ozone is decomposed at elevated temperatures.

5. An ozone decomposing reactor which comprises:
a casing having an axially extending passage for passing an ozone containing gas therethrough; and
a plurality of air permeable fiber sheets each extending along the passage and arranged parallel at a distance in the casing, said each sheet containing thereon or therein a catalyst having catalytic ozone decomposition activity to render the sheet active for ozone decomposition and an electroconductive material in the form of powder, fibers or whiskers in an amount of 20–60% by weight based on the sheet so that the sheet generates heat when electric current is applied thereto, and having a pair of electrodes attached to the opposite sides thereof to electrify the sheet, whereby ozone is decomposed at elevated temperatures.

6. An ozone decomposing reactor which comprises:
an air permeable foamed material selected from the group consisting of a synthetic resin foam and a ceramic foam and having thereon or therein a catalyst having catalytic ozone decomposition activity to render the sheet active for ozone decomposition and an electroconductive material in the form of powder, fibers or whiskers in an amount of 30–70% by weight based on the materials supported on the foamed material so that the sheet generates heat when electric current is applied thereto and electrodes attached to the foamed material to electrify the foamed material, whereby ozone is decomposed at elevated temperatures.

7. The ozone decomposing reactor as claimed in claim 6 wherein the catalyst and the electroconductive material are supported as a layer on the surface thereof.

8. A method of decomposing ozone contained in a waste gas which comprises: putting the gas into contact with an air permeable fiber sheet containing a catalyst having catalytic ozone decomposition activity to render the sheet active for ozone decomposition and an electroconductive material in the form of powder, fibers or whiskers in an amount of 20–60% by weight based on the sheet so that the sheet generates heat when electric current is applied thereto, whereby ozone is decomposed at elevated temperatures.

9. The method as claimed in claim 8 wherein the waste gas is passed through the sheet.

10. The method as claimed in claim 8 wherein the waste gas is passed along the sheet.

11. A method of decomposing ozone contained in a waste gas which comprises: putting the gas into contact with an air permeable foamed material containing a catalyst having catalytic ozone decomposition activity to render the material active for ozone decomposition and an electroconductive material in the form of powder, fibers or whiskers in an amount of 30–70% by weight based on the materials supported on the foamed material so that the foamed material generates heat when electric current is applied thereto, whereby ozone is decomposed at elevated temperatures.

12. The method as claimed in claim 11 wherein the waste gas is passed through the foamed material.

13. The method as claimed in claim 11 wherein the waste gas is passed along the foamed material.

* * * * *